Figure 1:
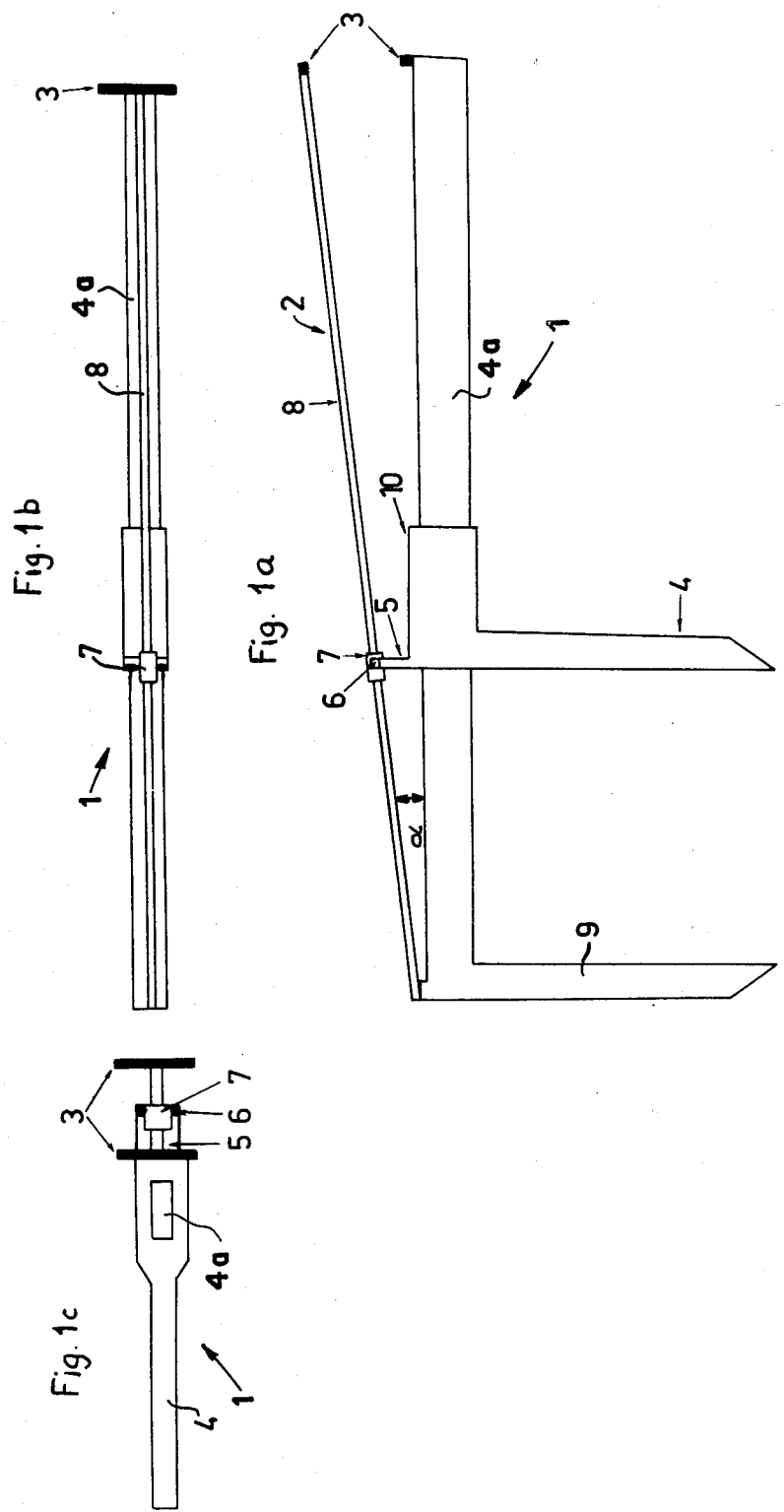

United States Patent [19]

Turén

[11] 4,219,939
[45] Sep. 2, 1980

[54] METHOD AND DEVICE FOR SURVEYING THE BASAL AREA OF A FOREST STAND

[76] Inventor: Christer Turén, 4 Slädvägen, S-902 35 Umeå, Sweden

[21] Appl. No.: 925,983

[22] Filed: Jul. 19, 1978

[30] Foreign Application Priority Data

Jul. 27, 1977 [SE] Sweden ............................ 7706474

[51] Int. Cl.² .................... G01C 1/00; G01C 15/00
[52] U.S. Cl. ......................... 33/275 R; 33/277; 33/278; 33/285
[58] Field of Search ............ 33/277, 275 R, 278, 33/282, 283, 284, 285

[56] References Cited

U.S. PATENT DOCUMENTS

| | | | |
|---|---|---|---|
| 53,420 | 3/1866 | Daly | 33/277 |
| 794,071 | 7/1905 | Barbow | 33/282 |
| 1,274,315 | 7/1918 | Olin | 33/283 |
| 3,907,288 | 9/1975 | Hudak | 33/277 |

FOREIGN PATENT DOCUMENTS 65606 2/1892 Fed. Rep. of Germany ............ 33/277
44678 9/1961 Poland ...................................... 33/277

Primary Examiner—Steven L. Stephan
Attorney, Agent, or Firm—Schuyler, Birch, McKie & Beckett

[57] ABSTRACT

The present invention relates to a method and device for carrying out a survey of the basal area of a forest stand and the distribution of the individual trees with respect to diameter classes.

The device of the invention comprises a caliper combined with a relascope in such a way that a certain position of the caliper corresponds to a certain sighting-angle. Furthermore the device comprises a sight field located at an observation point. When practicing the method of the invention the tree to be measured is calipered. Then the sighting-angle of the relascope is compared to the sight field and by checking if the sight field is within the sighting-angle it is determined whether the measured tree is within its border line circle or not.

8 Claims, 10 Drawing Figures

METHOD AND DEVICE FOR SURVEYING THE BASAL AREA OF A FOREST STAND

This invention relates to a method and device for carrying out a survey of the basal area of a forest stand and the distribution of the individual trees with respect to diameter classes.

For being able to determine the volume of a forest stand, the basal area of the trees (cross-sectional area, normally determined 1.3 m above ground level), their height and form must be known.

A known method of determining the basal area is to measure the diameter (to caliper) of the trees and to record the trees in classes of diameter. In order to reduce the work contribution, the calipering operation can be carried out on sample plots, whereafter the result obtained is multiplied by the ratio between the area of the forest and that of the sample plots. One problem in this respect is to determine the external boundaries of the sample plots, so that they are given the area intended.

The basal surface per unit of area also can be determined by means of the relascope introduced by the Austrian W Bitterlich. The device and the method and theory of its use are clearly described at pp. 348–352 of Loetsch, Zöhrer, Haller, *Forest Inventory*, Vol. 2, München, 1973. A gap opening with a certain definite width is positioned at a definite distance from the eye, for example 50 times the gap width. The sighting is directed over the gap opening toward the tree (normally at a height 1.3 m above ground level) about the point of observation. When counting all trees, which cover the gap opening, by using a relascope with the aforesaid ration between the gap width and the eye-gap distance (calculation factor 1), the basal area about the observation point in m²/ha is obtained. The ratio between gap width and eye-gap distance also can be drafted so that the number of trees covering the gap opening constitutes one half of the basal area per ha (calculation factor 2), one third of the basal area per ha (calculation factor 3), and so on.

When using the relascope, thus, no measuring is required for determining the external boundaries of the sample plots. A further prominent feature of the method is the increase in sampling intensity with increasing tree diameter, because trees with great diameter can be counted even when being some distance away from the observation point, while trees with small diameter must be close to said point in order to fill the gap and, thus, be counted.

At measurement with relascope, however, no distribution of the basal area on tree diameters is obtained, as in the case of calipering. The present invention has the object to provide a method and a device, at which the advantages of the relascope method are utilized and at the same time the distribution of the basal area with respect to tree diameters is obtained. Moreover, sources of errors and difficulties in the relascope method are eliminated by the invention.

Figure 2:
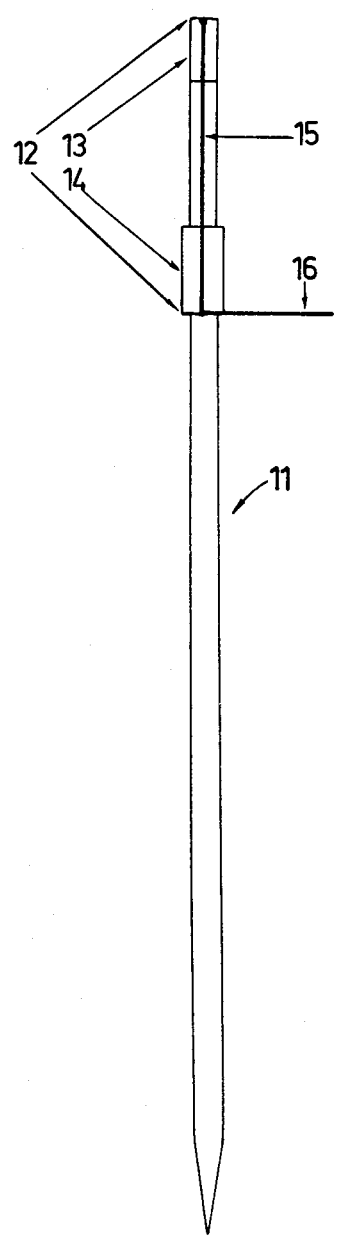
Figure 3:
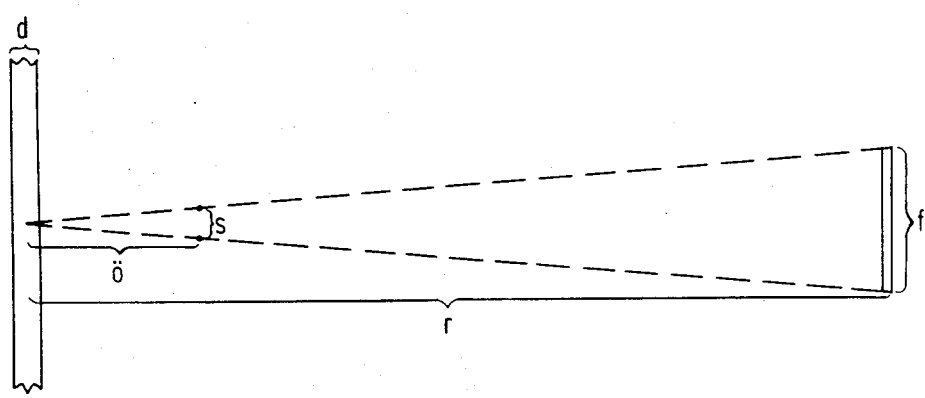
Figure 4:
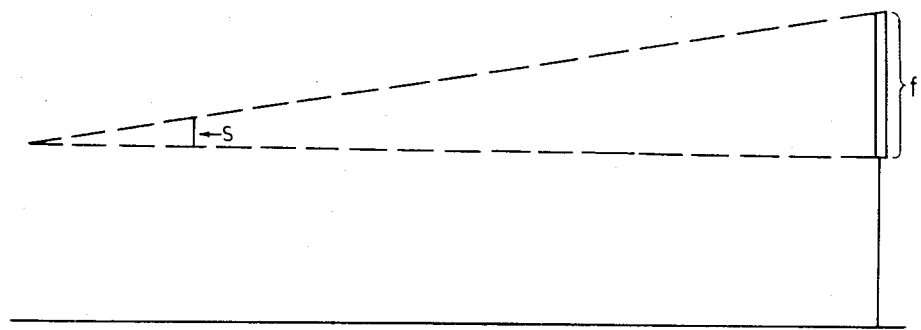
Figure 5:
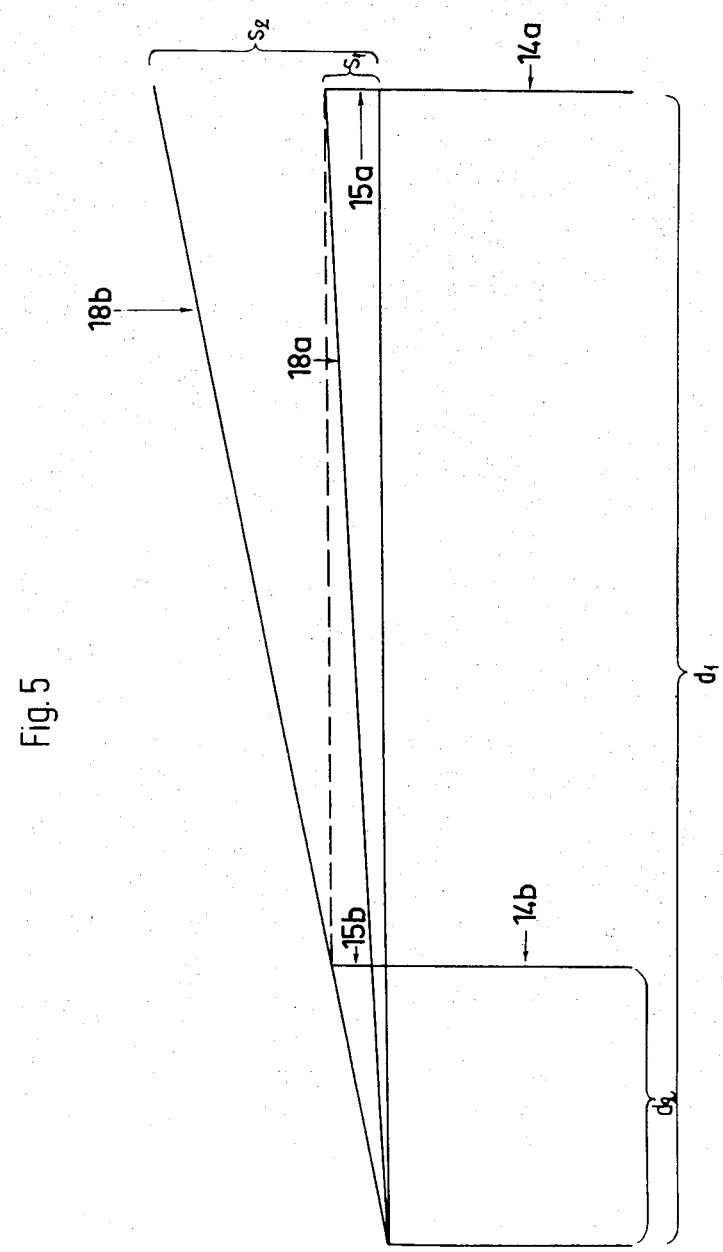
Figure 6:
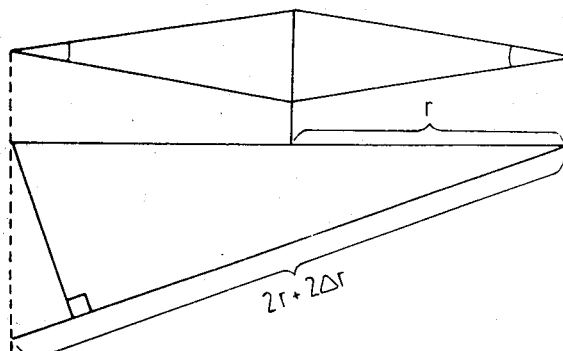
Figure 7:
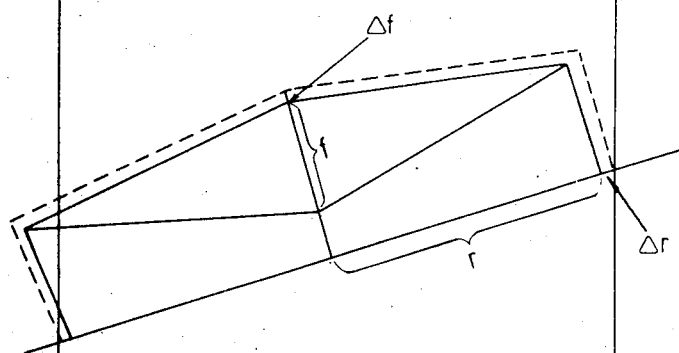
Figure 8:
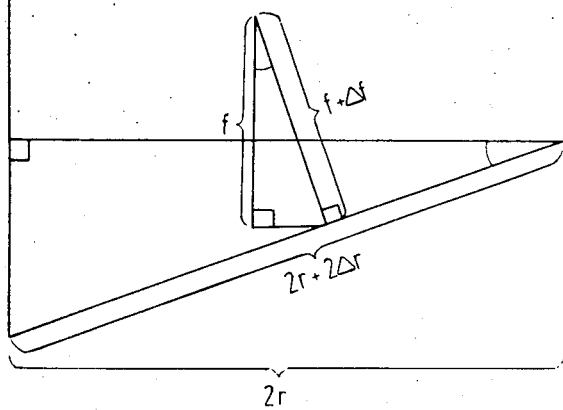

An embodiment of the invention is described in the following, with reference to the accompanying drawings, in which FIG. 1a is a front elevational view of the relascope caliper according to the invention, FIG. 1b is a top plan view thereof, FIG. 1c is an end elevational view thereof as seen from the right of FIGS. 1a and 1b, FIG. 2 shows a device for establishing a sighting field, FIG. 3 shows schematically sighting to the sighting field, FIG. 4 also schematically shows sighting to the sighting field, with the eye being on the same level as the lower edge of the sighting field, FIG. 5 schematically shows the relascope caliper in two different positions, and FIGS. 6, 7, 8 schematically show compensation for inclined ground-level plans.

The device shown in FIG. 1 consists of a caliper 1 for diameter measurement combined with a relascope 2 having a movable gap opening 3, which is made for sighting in the vertical plane. The movements of the movable leg 4 of the caliper along beam 4a are transferred to the gap opening via a shoulder 5, pin 6, sleeve 7 and a movable arm 8. The transfer system is designed so that the measurements of the gap opening 3 are inversely proportional to the measurements between the movable and fixed legs 4 and 9, respectively, of the caliper, and directly proportional to the sighting angle $a$ defined by arm 8 and beam 4a.

The movable leg of the caliper is locked in its position by a locking device 10 when one does not take hold of it. Said leg, therefore, is not displaced when, subsequent to the calipering of a tree one intends to sight through the relascope gap.

As appears from FIG. 2, the upper portion of the sighting rod or post 11 consists of a sighting field or marker strip 12, the upper and lower portions of which 13 and 14, respectively, are painted in colours contrasting to the gap opening 3 of the relascope caliper for more accurate sighting from a distance. Above and, respectively, below said fields additional fields with a different colour may be provided for marking the external boundaries of the original fields. Uppermost on the rod a pendulum 15 is attached. From the lowermost portion of the pendulum an arm 16 extends at a right angle to said pendulum. By insertion of a counterweight the pendulum will assume vertical position and the arm horizontal position.

During the transport of the rod, the horizontal arm can be folded up against the pendulum and together therewith be locked at the rod.

The lower portion 13 of the sighting field 12 consists of a tube, which encloses the sighting rod 11 and is movable upward and downward along the same. The tube can be locked in a desired position on the rod.

The sighting rod 11 can be extended telescopically and be locked in a desired position. Its base may be a point end as in FIG. 2 or a stand base.

Before the field work operation is started, the length of the pendulum 15 is adjusted to the desired calculation factor (see below). In addition, the length of the sight rod 11 is adjusted so that the lower edge 14 of the sight field 12 is located on eye level. Thereafter the observation points (determined objectively or subjectively) are tracked, about which the measurements are to be carried out. The sight rod 11 is positioned at the observation points perpendicularly to the main inclination of the ground and with the free end of the horizontal arm 16 directed upward along the possible descent. The pendulum 15 thereby assumes vertical position. The tube then assumes such a position, that its lower edge coincides with the point where the horizontal arm 16 is tangent to the sight rod 11. The sight field is thus augmented by a quantity Δf (see FIG. 7), elements 15 and 16 operating as a slope compensator.

About the sight rod 11 trees are tracked which assumedly are found within or close to the limiting circle radius applying to the diameter of the tree (see below). The limiting circle, or borderline circle, is conventionally defined in the Bitterlich method (see *Forest Inventory*, p. 348). The diameter of the tree is measured with the caliper. The gap opening 3 and the sighting angle α thereby automatically adjust to the position applying to the diameter. Maintaining the setting of the caliper, and thereby the gap opening, sighting is made to the sight field 12 from the location of the measured tree. When the gap opening 3 is wholly within by said field, the tree is located inside of the limiting circle and shall be recorded. In connection therewith its diameter (diameter class) can be recorded. When the opening 3 is not included within by the sight field 12, the tree shall not be recorded. The total number of recorded trees on the surface, multiplied with the calculation factor, renders the basal area per ha, and the diameter recordings render the distribution of this basal area with respect to diameters. A specific range of tree diameters (e.g., 10–15 cm.) is referred to as a diameter class.

During the sighting operation, the gap 3 all the time is to be held in vertical position.

As mentioned above, the system is to be designed so that the trees, which are recorded, stand within the limiting circle applying to the tree diameter in question. The ratio between the radius of said circle and the tree diameter may be 50/1 (calculation factor 1), $50/\sqrt{2}$ (calculation factor 2), $50/\sqrt{3}$ (calculation factor 3), 50/2 (calculation factor 4), and so on. In FIG. 3 is shown how the requirement is met thereby that the sight field f and the distance sight point-gap=ö are given measures determined for the instrument in question and the calculation factor, and that the transformation between the caliper and the gap is so adjusted that one is on the limiting circle r when the gap opening 3 at sighting coincides with the sight field f.

Consequently, at first the measure of the sight field f and the distance eye-gap=ö are determined. The first mentioned measure, however, applies only to plane ground levels. For inclined ground levels, the sight field, as shown below, is to be given an additional contribution depending on the ground level inclination. The distance eye-gap shall be at least about 70 cm to enable the eye to simultaneously and with reasonable sharpness distinguish both the gap and sight field.

For calculating the relation between the gap opening s and the tree diameter, firstly one proceeds due to the uniformity in FIG. 3 from the following:

$s/f = o/r$ $s = fö$

As mentioned previously, the ratio between the limiting circle radius r and the tree diameter d shall be 50/1, $50/\sqrt{2}$, $50/\sqrt{3}$ and 50/2 for the calculation factors 1, 2, 3 and 4, respectively.

Thereby are obtained:
$s = fö/50\ d$ — (calculation factor 1)
$s = fö\sqrt{2}/50\ d$ — (calculation factor 2)
$s = fö\sqrt{3}/50\ d$ — (calculation factor 3)
$s = fö/25\ d$ — (calculation factor 4)

In order to simplify the construction, the instruments have been modified as follows:

The correction for calculation factor is made on the sight field f instead of via the gap width. This implies that the sight field is given the measures $f$, $f/\sqrt{2}$, $f/\sqrt{3}$ and f/2 for calculation factor 1, 2, 3 and 4, respectively.

The correction is effected by changing the length of the pendulum 15 in FIG. 2.

Instead of, as in FIG. 3, positioning the eye at the same height as the centre of the sight field, the eye can be positioned at the same height above ground level as the lower edge of the sight field, see FIG. 4. In the same way only one movable arm, 8 in FIG. 1, on the relascope caliper is required instead of two. The movable arm also can be positioned below the fixed arm, in which case the eye shall be at the same height above ground level as the upper edge of the sight field. The shoulder 5 in FIG. 1 shall be perpendicular to the fixed arm.

FIG. 5 shows in a schematic manner the relascope caliper with two positions for the movable legs 14a and 14b of the caliper and with corresponding positions for the shoulder, 15a and 15b, and for the movable arm, 18a and 18b. The positions correspond to the diameters $d_1$ and $d_2$ and the gap openings $s_1$ and $s_2$. The diameter $d_1$ is the greatest one to be measurable with the caliper, while $d_2$ is chosen arbitrarily. For the diameter $d_1$, the movable leg of the caliper is located at 14a. The shoulder is located at 15a, and the movable arm at 18a. The gap opening $s_1$ is here = the height of the shoulder 15a.

$S_1$ is to be given such a measure that the sight field at sighting from the limiting circle applying to $d_1$ coincides with the gap. For calculation factor 1 the relation then is $S_1 = fö/50\ d_1$ (When the distance eye-gap ö is made = the greatest diameter $d_1$, $s_1 = f/50$).

When a tree with the diameter $d_2$ is measured, the movable leg of the caliper is given the position b, the shoulder 15b, the movable arm 18b and the gap thereby the measure $s_2$. Due to uniformity in the Figure are obtained:

$$\frac{s_2}{d_1} = \frac{s_1}{d_2} \quad s_2 = \frac{s_1 \cdot d_1}{d_2} = \frac{fö \cdot d_1}{50\ d_1 \cdot d_2} \quad s_2 = \frac{fö}{50\ d_2}$$

Thus, also for the diameter $d_2$ the gap opening $s_2$ is obtained, so that at sighting from the limiting circle of $d_2$ over $s_2$ the gap opening and sight field coincide.

Collected data normally are desired to be related to the surface in the horizontal projection, because the maps are made in this projection. This implies that on inclined ground level the limiting circle is to be transformed to an ellipse with the great axis in the direction of the inclination. The length of the great axis shall be such, that its projection in the horizontal plane is the one which applies to respective tree diameter on horizontal ground level. The limiting circle radius, therefore, in the direction of the great axis shall be given the additional contribution Δr, see FIG. 6. The small axis of the ellipse shall be equal to the diameter for the corresponding limiting circle on horizontal ground level.

The necessary extension of the great axis is obtained by giving the sight field f an additional contribution Δf. Δf/f shall be = Δr/r (similar triangles), see FIG. 7.

Δf thereafter is given such a size that f+Δf in vertical projection = f. Hereby two similar right triangles are obtained with the hypotenuses f+Δf and 2r+2Δr irespectively and the catheters f and 2r, respectively, see FIG. 8.

$$\frac{\Delta f + f}{f} = \frac{2r + 2\Delta r}{2r} \quad \frac{\Delta f}{f} + 1 = 1 + \frac{\Delta r}{r} \quad \frac{\Delta f}{f} = \frac{\Delta r}{r}$$

As the sight field is to be placed at a right angle to the ground level, and the gap opening is held in vertical position, the described extension of the great axis of the ellipse is obtained and at the same time the small axis remains equal to the original limiting circle radius. Points therebetween land up on the ellipse.

The correction for inclined ground level also can be omitted or be made later on the basis of recorded ground level inclination. The means 14, 15 and 16 on the sight rod in FIG. 2 then can be omitted. The gap at this method shall all the time be held in the same inclination as that in which the rod appears to the surveyor.

The aforedescribed method according to the invention, in addition to rendering the distribution of the basal area with respect to tree diameters, also reduces a number of inconveniences involved with relascope measuring methods applied at present.

With known methods, for example, the sighting is made to trees, the surface of which may be more or less diffuse. With the present invention, however, the sighting is made to a sight field contrasting and sharply defined in relation to the gap, thereby providing greater safety.

Due to the sighting in the horizontal plane, the sight lines often are interrupted by intermediate trees and other obstacles. This shortcoming is eliminated when sighting in the vertical direction according to the invention.

With relascopes for conventional sighting to tree stems, at least for lower calculation factors the angle between the sight lines (limiting angle) is relatively acute and, consequently, a wrong observation is of greater impact than if the limiting angle was less acute. With the method here described the limiting angle can be made more obtuse.

With methods used at present the sighting usually is made from eye level to a height of 1.3 m on the tree. This implies that the sighting takes place in a plane being the shell surface of a cone. With the method here described the sighting takes place a plane in parallel with the ground level.

With conventional methods, furthermore, the sighting is directed to a chord through the basal area of the tree and not to the diameter. This error is eliminated here.

The basal area of the tree normally is surveyed per ha in the horizontal projection. At conventional relascope measurement the possibilities of correction are limited while with the method described here a safe correction can be made by extending the sight field.

The invention is not restricted to the embodiment shown, but can freely be varied within the scope of the attached claims.

I claim:

1. A method of surveying a forest stand of trees distributed around an observation point to determine its basal area per unit area of forest and its tree distribution with respect to diameter classes, comprising the steps of:

locating a sight field marker at the observation point said sight field marker bearing a delineated sight field of predetermined size;

measuring the diameter of each tree to be surveyed, preferably at a height of about 1.3 m. above ground level;

establishing a sighting angle for each tree measured, the sighting angle being a function of the measured tree diameter, and setting the sighting angle on a viewing means;

viewing the sight field on the sight field marker through the sighting angle set on the viewing means from a place spaced from the observation point by a distance equal to the spacing between the observation point and the measured tree, to determine if the sight field lies within the sighting angle; and recording the diameter of the measured tree if the sighting angle does not wholly encompasses the sight field.

2. A method according to claim 1 wherein the sighting angle is established according to a relationship wherein the sighting angle is inversely proportional to the tree diameter.

3. A device for surveying a forest stand of trees distributed around an observation point to determine its basal area per unit area of forest, its tree distribution with respect to diameter classes and other parameters, comprising:

adjustable caliper means for measuring tree diameters comprising a beam and two parallel arms connected to said beam generally transverse to said beam, at least one of said arms movable along said beam relative to the other arm; and viewing means coupled to said caliper means for delineating a sighting angle whose size varies inversely with the caliper setting, said viewing means comprising a rod hinged at one of its ends to said other arm adjacent its connection with said beam, and a slide movable along said rod and pivotally connected to said one arm adjacent its connection with said beam, said sighting angle defined by said rod and said beam.

4. A device according to claim 3 further comprising sight field marker means adapted to be placed at said observation point, said marker means bearing a marker strip of predetermined length representative of said sight field to which said sighting angle is to be compared from a distance.

5. A device according to claim 4 wherein the length of said marker strip is variable.

6. A device according to claim 5 wherein said marker means comprises an elongated post adapted to be supported perpendicular to the ground.

7. A device according to claim 6 further comprising slope compensation means carried on said post for increasing the length of said marker strip in proportion to the slope of the ground at said observation point.

8. A device according to claim 7 wherein said slope compensation means comprises an L-shaped pendulum pivoted at the end of one of its legs to said post above said marker strip, the free leg of said pendulum crossing said marker strip and delineating the bottom of said sight field.

* * * * *